United States Patent [19]

Upson et al.

US005173174A

[11] Patent Number: 5,173,174
[45] Date of Patent: Dec. 22, 1992

[54] METAL-TOLERANT FCC CATALYST AND PROCESS

[75] Inventors: Lawrence L. Upson, Barrington, Ill.; Pieter J. Van De Gender, Reisterstown, Md.; Wim Van Dijk, Haaren, Netherlands

[73] Assignee: UOP, Des Plaines, Ill.

[21] Appl. No.: 673,887

[22] Filed: Mar. 22, 1991

Related U.S. Application Data

[63] Continuation-in-part of Ser. No. 390,308, Aug. 7, 1989, abandoned, and a continuation-in-part of Ser. No. 520,997, Jul. 5, 1990, abandoned, which is a continuation of Ser. No. 216,109, Jul. 7, 1988, abandoned.

[51] Int. Cl.$^5$ ............... C10G 11/02; C10G 11/05
[52] U.S. Cl. ............... 208/120; 208/113; 208/118; 208/119
[58] Field of Search ............... 208/118, 119, 120; 502/65, 73

[56] References Cited

U.S. PATENT DOCUMENTS

| | | | |
|---|---|---|---|
| 3,140,253 | 7/1964 | Plank et al. | 208/120 |
| 3,322,690 | 5/1967 | Bilisoly | 252/455 |
| 3,524,820 | 8/1970 | Vesley | 252/455 |
| 3,944,482 | 3/1976 | Mitchell et al. | 208/120 |
| 3,957,623 | 5/1976 | McDaniel et al. | 502/65 |
| 4,206,082 | 6/1980 | Murtha | 252/455 Z |
| 4,272,358 | 6/1981 | Buron | 208/120 |
| 4,311,581 | 1/1982 | Barron | 208/115 |
| 4,341,661 | 7/1982 | Barron et al. | 252/455 Z |
| 4,429,053 | 1/1984 | Ward | 502/65 |
| 4,437,978 | 3/1984 | Chester et al. | 208/120 |
| 4,515,683 | 5/1985 | Beck et al. | 208/113 |
| 4,542,116 | 9/1985 | Bertolacini et al. | 502/65 |
| 4,606,813 | 1/1985 | Byrne et al. | 502/65 |
| 4,921,824 | 5/1990 | Chin et al. | 502/65 |

*Primary Examiner*—Helane Myers
*Attorney, Agent, or Firm*—Thomas K. McBride; John F. Spears, Jr.

[57] ABSTRACT

A metals-tolerant FCC catalyst and a process using the catalyst are disclosed. The catalyst matrix comprises bastnaesite and a limited quantity of a large pore boehmite alumina having an average pore diameter greater than 90 Angstroms. The catalyst preferably also contains a molecular sieve component, a siliceous binder and a clay component. The catalyst formulation reduces the harmful effects of accumulated nickel and vanadium on catalyst activity and selectivity. Hydrogen and coke production are reduced.

8 Claims, 4 Drawing Sheets

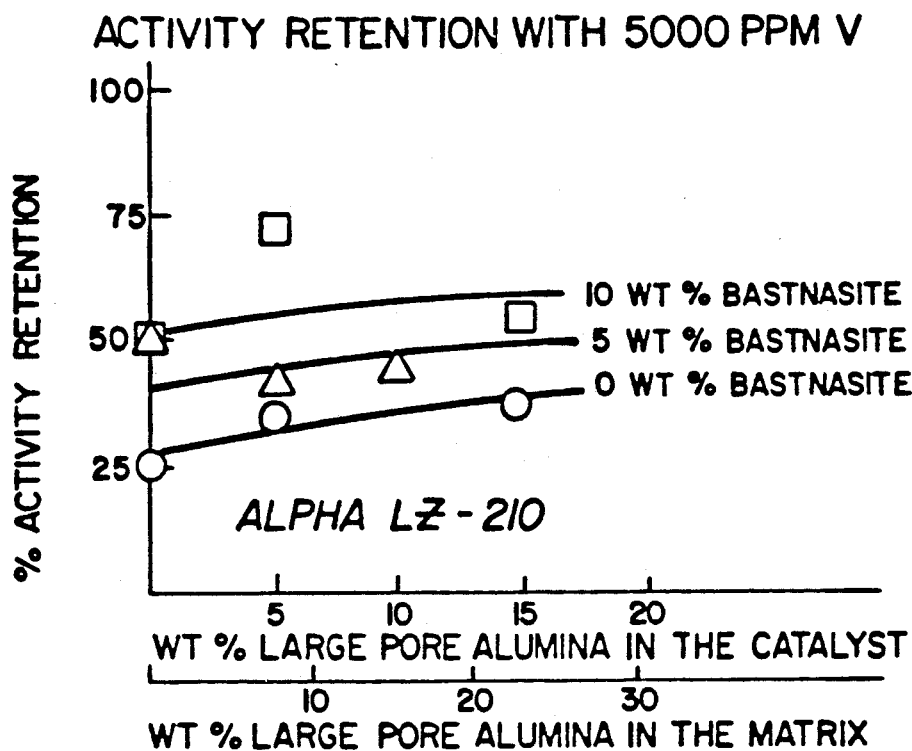
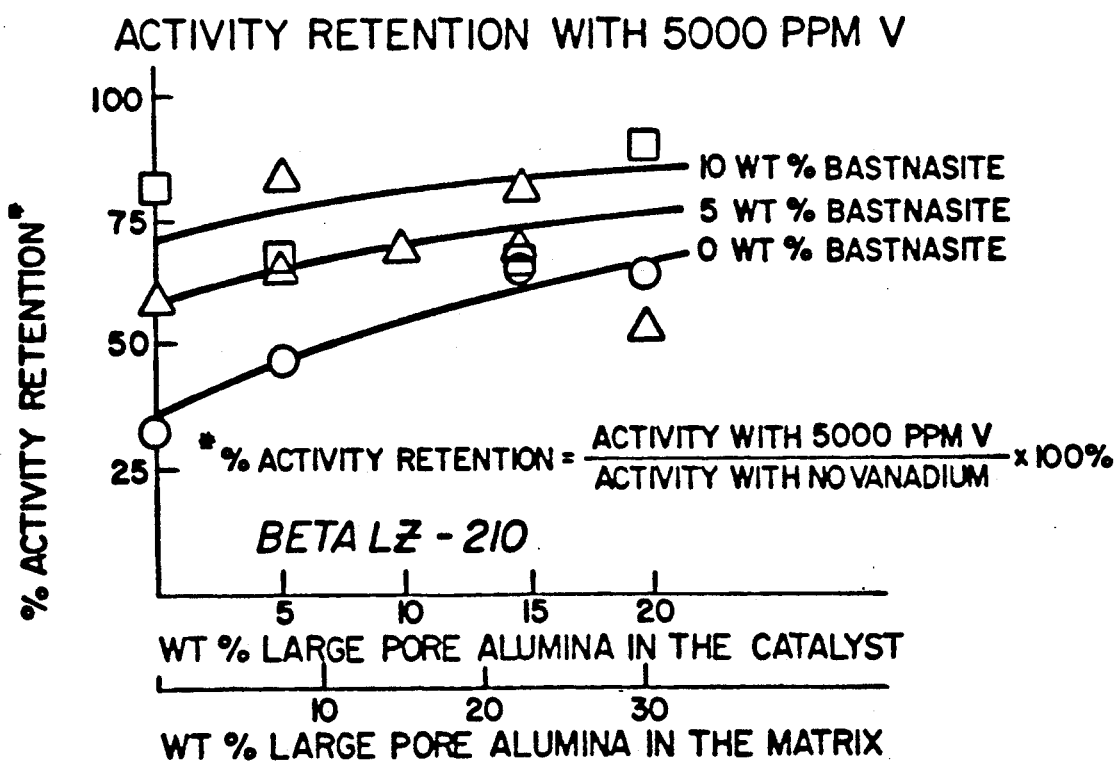

COKE SELECTIVITY WITH 5000 PPM VANADIUM

COKE SELECTIVITY WITH 5000 PPM VANADIUM

LIGHT GAS SELECTIVITY WITH 5000 PPM VANADIUM

LIGHT GAS SELECTIVITY WITH 5000 PPM VANADIUM

METAL-TOLERANT FCC CATALYST AND PROCESS

CROSS REFERENCE TO RELATED APPLICATION

This application is a continuation-in-part of prior copending applications Ser. No. 07/390,3089 filed Aug. 7, 1989 now abandoned and 07/520,997 filed Jul. 5, 1990 now abandoned; which prior applications are continuations of application Ser. No. 07/216,109 filed Jul. 7, 1988 now abandoned.

BACKGROUND OF THE INVENTION

1. Field of the Invention

The invention relates to fluidized catalytic cracking catalysts comprising in admixture a molecular sieve component, a large pore matrix component, and a rare earth component. Such catalysts exhibited improved performance in the presence of high levels of vanadium and/or nickel. This invention also relates to fluidized catalytic cracking (FCC) processes utilizing such catalysts.

FCC feed stocks can contain large quantities of metal contaminants including vanadium and nickel, which are the most deleterious. Accumulation of these metals can damage the FCC catalyst and adversely effect the product yield of the process. For instance, vanadium pentoxide formed in the regenerator causes irreversible destruction of the zeolite crystalline structure resulting in a loss of surface area and catalytic activity. Product selectivity will be altered significantly by the presence of vanadium causing the production of more undesired hydrogen and coke. Nickel which accumulates on the catalyst does not cause the destruction of crystalline zeolite material but does produce large quantities of hydrogen and coke.

It has therefore been deemed highly desirable to find a catalyst or process which reduces these negative effects of vanadium and nickel.

2. Prior Art

U.S. Pat. No. 4,341,661 issued to K. Barron et al. is believed relevant for its teaching that a bastnaesite component is effective in reducing the sulfur oxide and carbon monoxide emissions from an FCC regeneration zone. The bastnaesite may be employed in the form of separate particles which circulate through the FCC unit with the catalyst or the bastnaesite may be physically incorporated into the catalyst. Typical FCC catalyst components (matrix and binders) and preparation methods are disclosed. U.S. Pat. No. 4,429,053 issued to D. J. Ward describes a catalyst containing Y zeolites which are prepared by exchanging a sodium Y zeolite with one or more rare earth elements such as lanthanum and cerium. This reference states a mixture containing the rare earths in a distribution similar to that of the rare earth ore (e.g., bastnaesite, monazite, xenotime) is preferably used to introduce the recovered rare earth metals into the zeolite (column 5, lines 20-26). This catalyst is described as useful in a variety of reactions including hydrocracking, alkylation or cracking.

The catalytic deactivating effects of vanadium can be substantially prevented by incorporating a vanadium trapping agent. Alumina has been proposed as such a trapping agent (UK Patent Application GB 2,116,062A-1983) as have rare earth compounds (U.S. Pat. Nos. 4,515,683-1985). It is well known, however, that alumina addition results in a distinct deterioration in FCC catalyst selectivity, causing an increase in the undesirable yields of coke and light gases (YOUNG G. W., CREIGHTON J., WEAR C. C., and RITTER R. E. Paper AM-87-51 presented at the 1987 NPRA Annual Meeting March 1987, San Antonio, Tex.).

Large pore (>90 angstrom avg. diameter) matrices have been claimed to be more suitable than small pore matrices in that the large pore matrices reduce the coke and light gas formation caused by the contaminant metals (U.S. Pat. Nos. 3,944,482-1976), the teachings of which are incorporated herein by reference. Moreover, it has been maintained that the best performance is obtained with a matrix that contains a high level of this large pore component, specifically greater than 25 wt % of the matrix and preferably more than 50 wt % of the matrix.

U.S. Pat. No. 4,515,683 teaches that rare earth impregnation on the catalyst works better as a metals trap than does ion exchanged rare earth. In addition a high degree of rare earth prevents the FCC catalyst from acting as an octane catalyst. (Upson L. L.—"What to look for in Octane Catalyst"—Paper given at Katalistiks Octane Symposium, Amsterdam, January 1986).

U.S. Pat. No. 4,606,813 issued to J. W. Byrne et al. is directed to an FCC catalyst comprising a blend of a catalytically active first component and a second component for reducing sulfur oxide emissions from the FCC regenerator. The second component comprises at least 70 wt. % alumina having an equilibrium surface area of 40-100 m²/g.

SUMMARY OF THE INVENTION

We have found that when a limited amount of large pore alumina and a rare earth ore, such as bastnaesite, are both employed in an FCC catalyst it is possible to obtain good bottoms cracking, higher metal tolerance, and improved selectivity in terms of reduced hydrogen and coke production coupled with increased light cycle oil yield. The addition of bastnaesite to a catalyst containing a large pore alumina matrix overcomes the adverse effects of alumina toward coke and light gases. The beneficial effects of this combination have not been recognized in the prior art.

The present invention provides a metal-tolerant fluid catalytic cracking catalyst. The catalyst comprises an admixture of a molecular sieve component, a small quantity of a large pore alumina matrix component, and a rare earth ore component such as bastnaesite. The catalysts of the present invention find particular utility in the cracking of heavy feeds and/or residual oils where high levels of metals, particularly of vanadium and nickel, may be present.

One embodiment of the invention may be characterized as a fluidized catalytic cracking process which comprises contacting a feedstream containing at least 1 wt ppm nickel and/or vanadium with an equilibrium catalyst in a reaction zone maintained at FCC reaction conditions, which catalyst contains in excess of 1000 ppm nickel and/or vanadium and comprises from about 10 to about 50 wt percent molecular sieve, from about 5 to 25 wt percent of an alumina having an average pore diameter greater than 90 angstroms, from about 3 to about 15 wt percent bastnaesite, from about 10 to 25 wt percent of a binder and from about 20 to about 60 wt percent of an inert refractory inorganic oxide material.

BRIEF DESCRIPTION OF DRAWINGS

FIGS. 1a through 4b graphically depict the result of examples set out below giving activity and product selectivity data as the catalyst formulations are varied.

DETAILED DESCRIPTION OF THE INVENTION

Figure 2A:
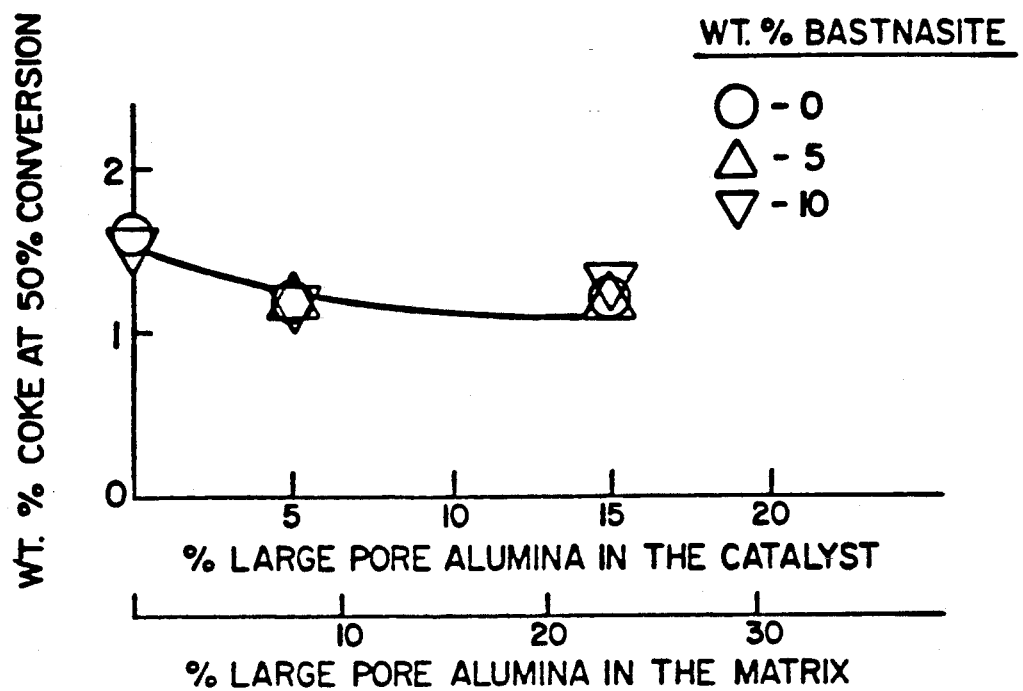

In an FCC process the feed stream such as a gas oil or a HVGO (heavy vacuum gas oil) is contacted with a fluidized or ebulated bed of catalyst. Such a feed has an initial boiling point of about 500°–650° F. (260°–343° C.) and an end boiling point of about 900°–1000° F. (482°–538° C.). This contacting is commonly performed in a riser-type reactor with the feed and catalyst traveling upward through a lengthy vertical reactor and being separated at the outlet of this reactor. Contacting may also occur in a "bubbling" bed of the catalyst retained within a lower portion of a vessel. Average contact times are in the range of about 1.5 to about 5 seconds. FCC reaction conditions also include a temperature of about 900°–1050° F. (482°–566° C.) and an absolute pressure of from atmospheric to about 4 bars. The reaction is normally performed in the absence of added hydrogen. A limited amount of steam may be charged to the reaction zone. The vaporous portion effluent of the reaction zone is quickly separated from the catalyst and fed to a fractional distillation zone. The reaction zone effluent is therein separated into a stream of light gases such as ethane, propane, propylene, butane and butylene and one or more product streams—typically naphtha, kerosene, diesel fuel and heavy distillate which is withdrawn from the process as separate product streams. The used or spent catalyst is passed into a regeneration zone in which the carbonaceous deposits referred to as coke are removed by combustion. FCC processes are widely used commercially and are described in U.S. Pat. Nos. 4,551,229; 4,504,380; 4,384,948; 4,340,566 and 4,211,636 which are incorporated herein by reference.

The detrimental effects described above caused by the accumulation of metal on an FCC catalyst are a major factor in determining the rate at which used catalyst must be withdrawn from an FCC process and replaced with new catalyst. The withdrawn catalyst is typically disposed of as by landfilling, but the metals content of the catalyst can make this unacceptable. New technology is being developed for removing metals from used catalyst, but employing this technology costs money for equipment, labor and supplies. It is accordingly one objective of the invention to reduce the effects of accumulated metals on the activity and selectivity of equilibrium FCC catalysts and hence reduce the required rate of catalyst withdrawal. It is another objective to improve the product distribution and yield obtained in an FCC process while processing a metal containing feedstock by reducing coke and by-product formation.

Coke deposited on the catalyst represents a loss in potential products. In addition it is necessary to burn off the coke in the FCC catalyst regeneration zone. This produces a higher volume of off gas, requires more air to be charged to the regeneration zone and increases the amount of heat released in the regeneration zone. Any one of these factors may limit the capacity of the regeneration zone and therefore of the entire conversion process. It is yet another objective of the invention to increase FCC unit capacity or the amount of feedstock which can be processed by a unit which is restrained by an inability to burn additional amounts of coke which has been deposited on the catalyst in the reaction zone.

The benefit or utility of the subject invention becomes greater as the concentration of accumulated metal on the catalyst increases. As used herein the term "accumulated metal" is intended to refer to metal originally present in an FCC feedstream and subsequently deposited on a catalyst during usage in an FCC process. The accumulated metals will normally be nickel and vanadium but other metals can be present. The invention finds utility at accumulated metal levels above about 1000 wt. ppm. The advantages of the invention become more pronounced at higher levels such as 2000 wt. ppm or 3000 wt. ppm accumulated metals. Specific embodiments of the invention therefore utilize an equilibrium catalyst having these higher metal contents.

We have now found that matrices which contain low surface area large pore alumina have an optimal metals tolerance at a large pore alumina level considerably below the 50 wt % of matrix level preferred in the previously cited U.S. Pat. No. 3,944,482. The preferred level from our studies is in the range of up to about 25 wt % large pore alumina in the matrix and most preferably 5–20 wt %. In terms of total catalyst composition the preferred level would be in the range of about 5–15% by weight.

Figure 3A:
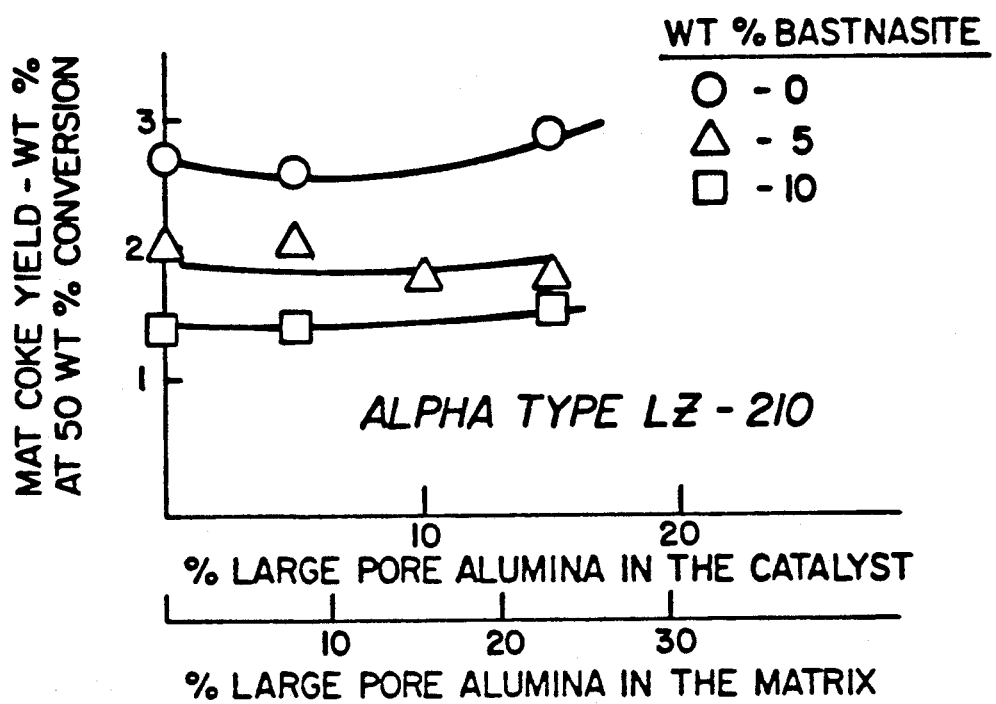
Figure 3B:
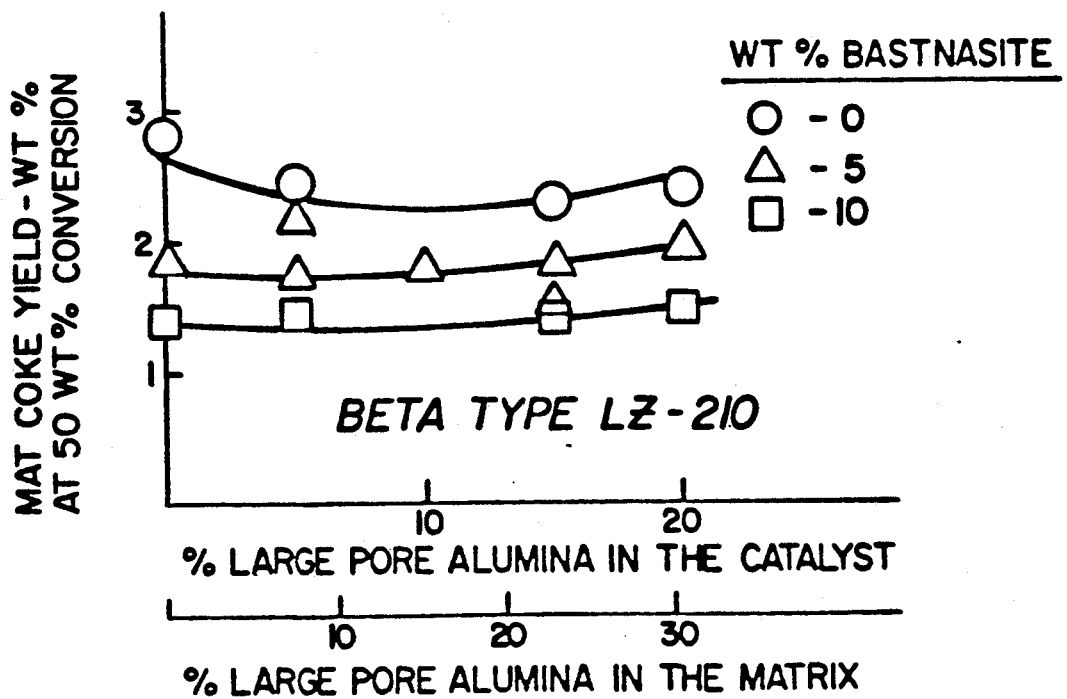
Figure 4A:
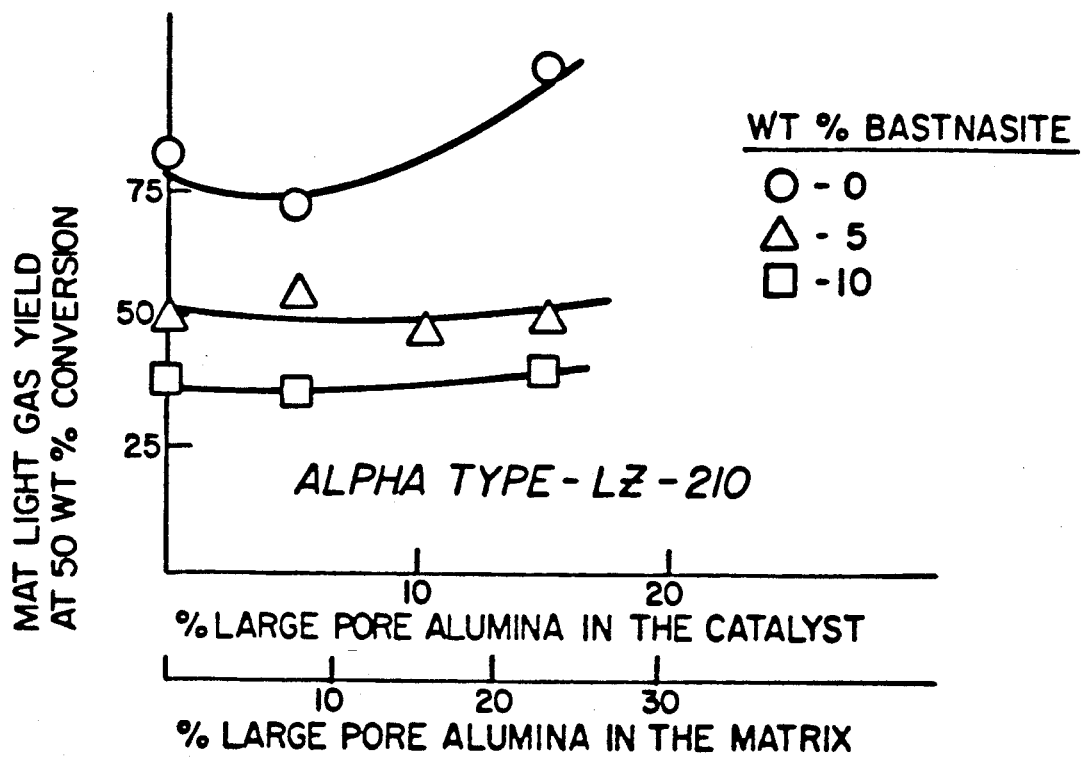
Figure 4B:
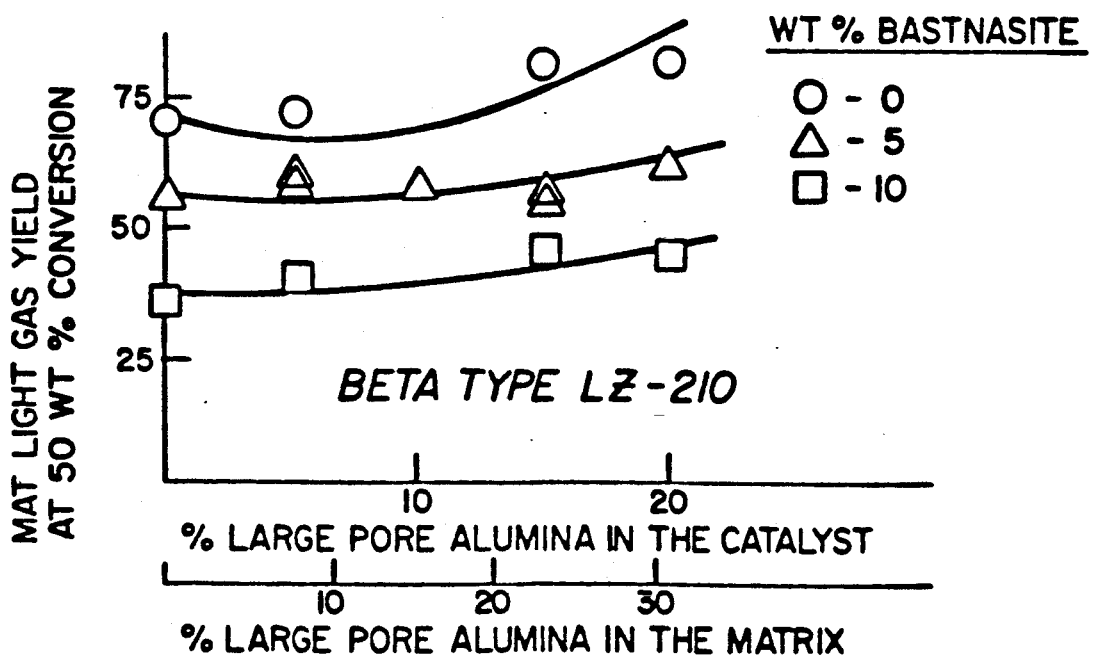

We have also found that the use of bastnaesite in an FCC catalyst matrix significantly improves coke and light gas selectivity and catalyst stability in the presence of high levels of vanadium as is also seen in FIGS. 1, 3 and 4 for the 0% alumina case.

In this invention, a large pore alumina is used which, when added to the total catalyst matrix, results in an average pore diameter of the matrix greater than 90 Å. A preferred range of average matrix pore diameters is from about 90 to 200 angstroms, and more preferably from 100- about 140 angstroms. The preferred alumina is a monohydrate. An especially preferred type of alumina would be a boehmitic (crystalline alpha monohydrate) alumina. It is contemplated a pseudoboehmite alumina could also be employed.

In the large pore alumina catalysts of this present invention, the matrix surface area is in the range of 25–60 m²/gm compared to 150–250 m²/gm surface area for the matrices described in U.S. Pat. No. 3,944,482. The large (greater than 500 m²/g) surface area of the zeolite coupled with the presence of a sizable amount of zeolite in the catalyst particles results in the overall catalyst having a much larger surface area. A typical surface area should be over 150 m²/g. The surface area of the overall (finished) catalyst is preferably between 150 and 350 m²/g and more preferably between 200 and about 300 m²/g.

An illustration of the performance of a catalyst having a matrix containing a large pore alumina is shown in FIGS. 1–4 (0% bastnaesite). The alumina was incorporated into two different types of catalysts, each having an LZ-210 type molecular sieve with differing $SiO_2/Al_2O_3$ ratios. These catalysts were impregnated with vanadium and/or nickel.

Figure 2B:
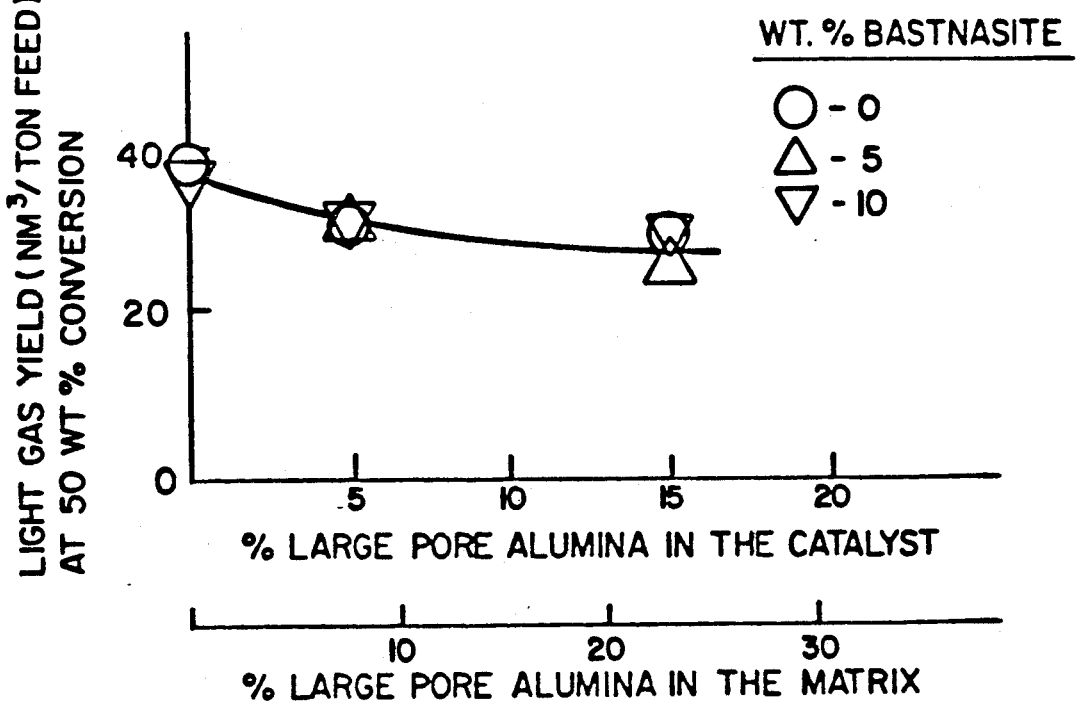

These figures also illustrate the positive and negative effects of increasing the level of large pore alumina in a catalyst formulation. First, FIG. 1 shows the positive effect of the large pore alumina (with 0% bastnaesite) on the stability of the catalysts after vanadium impregnation. Secondly, FIG. 2 shows the reduction in coke and light gas that added large pore alumina can achieve when nickel is present. In addition, a high degree of matrix alumina is desirable since it directly improves the bottoms cracking characteristics of the FC catalyst (Young G. W. et al cited earlier). FIGS. 3 and 4 show that for catalysts without bastnaesite coke and particularly light gas yields are severely increased (an unwanted result) when the amount of large pore alumina is increased in the presence of vanadium.

Thus, on the one hand, the presence of large pore alumina has very beneficial effects (improved catalyst stability in the presence of vanadium, improved selectivity in the presence of nickel, improved bottoms cracking), while on the other hand it has substantial negative effects (poorer catalytic selectivity in the presence of vanadium).

As mentioned earlier, rare earth compounds have also been known to act as metals traps. However, it is most desirable to have the rare earth components in the matrix of the FCC catalyst rather than ion exchanged into the molecular sieve portion of the catalyst.

In order to achieve a high rare earth level for metals trap purposes without a high degree of rare earth exchange, in the present invention we have incorporated bastnaesite into the catalyst matrix. Bastnaesite is a mixed rare earth flurocarbonate, either calcined or uncalcined, which remains stable and does not dissolve during the catalyst preparation procedure. Thus, the rare earth in bastnaesite does not ion exchange with the molecular sieve cation.

COMBINATIONS OF LARGE PORE ALUMINA AND BASTNAESITE

Two different catalyst base formulations, containing ALPHA LZ-210 and BETA LZ-210 sieves, were prepared with varying amounts of bastnaesite and large pore alumina. Alpha LZ-210 sieves are LZ-210 stabilized molecular sieves prepared from Na-Y, according to the procedures in U.S. Pat. No. 4,610,856 patent, and having a unit cell size in the range 24.58-24.62 A. Beta LZ-210 sieves are stabilized molecular sieves prepared from Na-Y also using the procedures in U.S. Pat. No. 4,610,856 with a unit cell size in the range 24.48 to 24.54 Å.

The results of evaluations of the various catalysts prepared were in excellent agreement for the two types of catalyst formulations and are reflected in the data presented in FIGS. 1-4.

From these data it can be concluded that for catalysts without bastnaesite, a small amount of large pore alumina improves the selectivity after vanadium impregnation. High contents of alumina, however, cause a significant increase in coke and light gas yields.

We have now found that bastnaesite added to catalysts containing matrices with large pore alumina overcomes the adverse effects of the alumina towards coke and light gas.

FIGS. 3 and 4 show very clearly that the presence of bastnaesite in large pore alumina containing catalysts results in a substantial improvement in coke and light gas selectivities in the presence of vanadium. The combination of large pore alumina and bastnaesite in the catalyst matrix also provides activity retention in the presence of vanadium superior to that achieved with either bastnaesite or alumina alone (FIG. 1).

The presence of bastnaesite enables one to add a substantial amount of alumina to the catalyst formulation, to provide increased bottoms cracking, without an increase in coke and light gas yield.

In summary it may be concluded that: 1) A catalyst with bastnaesite shows good vanadium tolerance; 2) A catalyst with large pore alumina shows good nickel tolerance and; 3) A catalyst with large pore alumina provides good bottoms cracking.

A catalyst that contains both bastnaesite and large pore alumina not only combines these three properties, but also shows better coke and light gas selectivities, than can be expected from the individual components.

While the invention has been described above, the scope of the present invention will be better understood by recourse to the following examples.

EXAMPLES

General Comments

Catalysts were prepared by mixing a molecular sieve with a combination of matrix materials and spray drying the mixture. The molecular sieves can be Na-Y type faujasite, or sieves derived from Na-Y, such as Ultrastable-Y or LZ-210 sieves. In these sieves the sodium content is reduced to improve hydrothermal stability. This is done via ion exchange of the sieve with an appropriate cation, for example NH4 and/ or rare earth ions, which may be performed either prior to mixing into the spray drier feed or after the particle has been formed by spray drying.

The matrix consists of an admixture of a large pore alumina and bastnaesite along with a binding agent such as a silica sol and an inert refractory oxide such as kaolin, such that the resulting matrix of the final catalyst particle has an average pore diameter in the range of 100-200 Å. As used herein the term "matrix" therefore refers to all materials in the catalyst except for the zeolite component.

EXAMPLES I-XVI

The above description of the method in which the catalyst for use in the samples was prepared emphasizes that all components of the catalyst are present in unitary catalyst particles. This is in distinction to the blends used in such references as U.S. Pat. No. 4,606,813.

The catalysts in these examples were formulated using the procedures outlined above, with a Beta type LZ-210 molecular sieve having a unit cell size of 24.52 Angstrom, and with varying amounts of bastnaesite and large pore alumina. All catalysts evaluated contained 35 wt % molecular sieve and were ion exchanged using identical procedures with equal amounts of ammonium and equal amounts of rare earth salts. A typical analysis of a Beta LZ-210 catalyst made with 5% bastnaesite and 15% large pore alumina is as follows:

| | |
|---|---|
| Surface area m 2/gm | 261 |
| Total pore volume cc/gm | 0.34 |
| Average matrix pore diameter Å | 110 |
| Bulk density gm/cc | 0.67 |
| Na$_2$O wt % (IGN. BASIS) | 0.21 |
| Re$_2$O$_3$ wt % (IGN. BASIS) | 4.3 |
| Al$_2$O$_3$ wt % (IGN. BASIS) | 32.7 |

The catalysts that were tested for metals tolerance were first dried ½ hour at 200° C. followed by a calcination at 560° C. for 2 hours.

The catalyst was then impregnated with vanadium naphthenate dissolved in toluene to the point of incipient wetness, dried at 110° C. for 1 hour to remove toluene and then for 1 hour at 225° C. to decompose the naphthenate and deposit the vanadium. This procedure was repeated a sufficient number of times to deposit 5000 PPM of vanadium upon the catalyst. The catalyst was then decoked for 3 hours at 560° C. in s muffle furnace and then deactivated in a fluidized bed using 100% steam as the fluidizing media for 18 hours at 750° C.

The catalytic properties of the impregnated and steam deactivated samples were determined in a microactivity test (MAT) unit at the following conditions:

| Reactor temperature | 500° C. |
|---|---|
| Weight Hourly Space Vel. | 16 |
| Cat/Oil WT/WT | 2, 3 and 4 |

The vacuum gas oil used as reactor feed for this MAT test has the following analysis:

| Distallation | °C. |
|---|---|
| IBP | 246 |
| 5% | 354 |
| 10% | 376 |
| 20% | 398 |
| 50% | 444 |
| 90% | 514 |
| 95% | 531 |
| EP | 552 |
| Density g/cc (15° C.) | 0.907 |
| Ramsbottom carbon | 0.23 wt % |
| Sulphur | 0.44 wt % |
| Basic nitrogen | 340 PPMW |
| Refractive index (40° C.) | 1.4960 |

The different cat/oil ratios provided a range of conversion which allowed the yield to be determined at a constant 50 wt % conversion. The coke and light gas yields at 50 wt % conversion for the catalyst studied are shown in Table 1 and in FIGS. 3 and 4. Light gas yields are defined as the sum of hydrogen, methane, ethane and ethylene expressed as Nm3/ton of feed.

TABLE 1

EXAMPLES I-XVI
BETA TYPE LZ-210
CATALYSTS WITH 5000 PPM VANADIUM

| | Catalyst Composition | | Yields at 50 wt. % conversion | | |
|---|---|---|---|---|---|
| Example | % Large Pore Alumina | % Bastna-site | Light gas (Nm3/ton of feed) | Coke (wt %) | Activity* retention |
| I | 0 | 0 | 70 | 2.80 | 0.33 |
| II | 0 | 5 | 55 | 1.85 | .61 |
| III | 0 | 10 | 35 | 1.40 | .82 |
| IV | 5 | 0 | 72 | 2.45 | .47 |
| V | 5 | 5 | 58 | 1.75 | .66 |
| VI | 5 | 5 | 61 | 2.20 | .83 |
| VII | 5 | 10 | 39 | 1.45 | .70 |
| VIII | 5 | 15 | 39 | 1.35 | .65 |
| IX | 10 | 5 | 57 | 1.80 | .69 |
| X | 15 | 0 | 83 | 2.30 | .65 |
| XI | 15 | 5 | 55 | 1.55 | .82 |
| XII | 15 | 5 | 57 | 1.85 | .69 |
| XIII | 15 | 10 | 46 | 1.40 | .67 |
| XIV | 20 | 0 | 82 | 2.40 | .62 |
| XV | 20 | 5 | 63 | 2.00 | .55 |
| XVI | 20 | 10 | 46 | 1.50 | .90 |

*activity with 5000 ppm V / activity with no V

EXAMPLES XVII-XXVI

Experiments were carried out with a different catalyst sieve formulation, Alpha LZ-210 having a unit cell size of 24.60 Å. The catalysts were prepared with varying amounts of bastnaesite and large pore alumina in the same manner as described for Examples I-XVI.

These catalysts were also impregnated with vanadium in the same manner as was done for Examples I-XVI, and the catalytic properties of the impregnated samples were tested in the same manner as for the previous examples.

The results of evaluations of the various catalysts tested were in excellent agreement with the results obtained for Examples I-XVI and are reflected in the data presented in Table 2 and FIGS. 1, 3 and 4.

TABLE 2

EXAMPLES XVII-XXVI
ALPHA TYPE
LZ-210 CATALYSTS WITH 5000 PPM VANADIUM

| | Catalyst Composition | | Yields at 50 wt. % conversion | | |
|---|---|---|---|---|---|
| Example | % Large Pore Alumina | % Bastna-site | Light gas (Nm3/ton of feed) | Coke (wt %) | Activity* retention |
| XVII | 0 | 0 | 83 | 2.70 | 25 |
| XVIII | 0 | 5 | 51 | 2.05 | 50 |
| XIX | 0 | 10 | 38 | 1.35 | 50 |
| XX | 5 | 0 | 73 | 2.60 | 36 |
| XXI | 5 | 5 | 55 | 2.05 | 42 |
| XXII | 5 | 5 | 35 | 1.40 | 73 |
| XXIII | 10 | 5 | 48 | 1.80 | 44 |
| XXIV | 15 | 0 | 100 | 2.90 | 37 |
| XXV | 15 | 5 | 50 | 1.80 | 52 |
| XXVI | 15 | 10 | 40 | 1.55 | 55 |

*activity with 5000 ppm V / activity with no V

EXAMPLES XXVII-XXXIV

Additional experiments were carried out with catalysts formulated with Beta LZ-210 sieve, the same sieve used in the catalysts of Examples I-XVI, and were prepared with varying amounts of bastnaesite and large pore alumina in the same manner as described in Examples I-XVI. IN the present examples the catalysts were impregnated with nickel to a level of 2500 PPMW. The method of impregnation was the same as was used in the previous examples with nickel naphthenate substituted for vanadium naphthenate in the impregnation. The catalytic properties of the impregnated samples were tested in the same manner as for the previous samples.

The results of evaluations of the various catalysts tested are reflected in the data presented in Table 3 and FIG. 2.

TABLE 3

EXAMPLES XXVII-XXXIV
BETA TYPE LZ-210 CATALYSTS WITH 2500 PPM NICKEL

| | Catalyst composition | | Yields at 50 wt % conversion | |
|---|---|---|---|---|
| Example | % Large pore alumina | % Bastnae-site | Light gas (Nm3/ton of feed) | Coke (wt %) |
| XXVII | 0 | 0 | 38 | 1.6 |
| XXVIII | 0 | 10 | 36 | 1.5 |
| XXIX | 5 | 0 | 31 | 1.2 |
| XXX | 5 | 5 | 31 | 1.2 |
| XXXI | 5 | 10 | 31 | 1.2 |
| XXXII | 15 | 0 | 30 | 1.2 |
| XXXIII | 15 | 5 | 26 | 1.2 |

TABLE 3-continued
EXAMPLES XXVII-XXXIV
BETA TYPE LZ-210 CATALYSTS WITH 2500 PPM NICKEL

| Example | Catalyst composition | | Yields at 50 wt % conversion | |
|---|---|---|---|---|
| | % Large pore alumina | % Bastnaesite | Light gas (Nm3/ton of feed) | Coke (wt %) |
| XXXIV | 15 | 10 | 30 | 1.3 |

DISCUSSION OF EXAMPLES I-XXXIV

From these data one can conclude that a fluid catalytic cracking catalyst, which can contain any one of a variety of molecular sieves, in combination with a large pore alumina and a source of non-exchangeable rare earth materials such as bastnaesite, improves the ability of the catalyst to maintain activity in the presence of high vanadium levels, and overcomes the tendency of prior art catalysts to produce excessive amounts of unwanted coke and light gas in the presence of vanadium and/or nickel.

DISCUSSION OF EXAMPLES XXV-XXXVI

Additional tests have indicated that adding both bastnaesite and large pore alumina improves catalyst selectivity in the presence of nickel. This result is viewed as surprising because the addition of bastnaesite alone had previously been found to have no effect on the performance of nickel loaded catalyst. The test results listed below are from a standard MAT test operated at a cat to oil ratio from 2:1 to 4:1 to provide a range of conversion that allows yields to be determined at a constant 70 wt. % conversion. In the catalyst formulations that were used only the type of matrix alumina or the presence of bastnaesite is varied. The large pore diameter alumina had an average pore diameter of about 110 Angstroms while the "small pore" alumina had an average pore diameter of about 50 Angstroms. The test results give the hydrogen and coke yields at 70 wt. % conversion by the same catalysts in a metal-free state and after being impregnated with 1000 ppm nickel.

| | $H_2$ Yield wt. % | | Coke Yield - wt. % | |
|---|---|---|---|---|
| | 0 ppm Ni | 1000 ppm Ni | 0 ppm Ni | 1000 ppm Ni |
| 0% Bastnaesite | | | | |
| 10% Small Pore $Al_2O_3$ | 0.07 | 0.27 | 1.76 | 2.69 |
| 10% Large Pore $Al_2O_3$ | 0.05 | 0.10 | 1.77 | 2.17 |
| 5% Bastnaesite | | | | |
| 10% Small Pore $Al_2O_3$ | 0.05 | 0.20 | 1.91 | 2.40 |
| 12% Large Pore $Al_2O_3$ | 0.04 | 0.07 | 1.51 | 1.85 |

Another positive surprise from this series of tests was an improvement in light cycle oil (LCO) selectivity. This is reported in the table below. A bastnaesite-containing large pore alumina matrix results in a lower yield of light cycle oil than a matrix of small pore alumina. The presence of bastnaesite improves the light cycle oil selectivity of the large pore alumina matrix, approaching the light cycle oil selectivity of the small pore matrix catalyst. However, this improvement does not extend to the small pore alumina matrix. The bastnaesite-free small pore matrix catalyst exhibits excellent light cycle oil selectivity. The bastnaesite-containing large pore matrix does not surpass it, but is markedly improved.

The results therefore indicate a selective positive improvement in hydrogen yield, coke yield (a decrease) and light cycle oil in the presence of nickel when both a large pore alumina matrix and bastnaesite are formulated into an FCC catalyst.

| | LCO Yields wt. % (at 70 wt. % conversion) | |
|---|---|---|
| | 0 ppm Ni | 1000 ppm Ni |
| 10% Small Pore $Al_2O_3$ | | |
| 0% Bastnaesite | 19.00 | 19.03 |
| 5% Bastnaesite | 18.96 | 18.98 |
| 10%-12% Large Pore $Al_2O_3$ | | |
| 0% Bastnaesite | 17.87 | 17.34 |
| 5% Bastnaesite | 18.54 | 18.05 |

The combination taught by the present invention allows one to incorporate higher amounts of alumina for bottoms cracking purposes without incurring the problems of prior art catalysts related to the production of excessive amounts of unwanted coke and light gas.

The molecular sieve content of the catalysts of the present invention can vary between 10-50 wt % of the total formulation, preferably in the range of 20-40 wt %. The large pore alumina content can vary between 0.5-25 wt % of the total formulation, preferably 5-20 wt %. The catalyst preferably contains over 5 wt. % alumina. Preferably, the bastnaesite will vary from about 0.5-15 wt %, preferably 3-15- wt. % and more preferably 3-10 wt %.

The binder can vary between 10-25 wt %, preferably 15-20 wt %. It is preferred to use a siliceous binder such as sodium silicate. The inert refractory oxide content can vary between 20-60 wt %, preferably between 25-40 wt %. Kaolin is a suitable material for this purpose. Clay of several types can be employed, but it is preferred that the matrix is free of any catalytically active material other than those set out herein such as added silica-alumina.

One embodiment of the invention may accordingly be characterized as a fluidized catalytic cracking process which comprises contacting a feedstream containing at least 1 wt ppm nickel and vanadium with a catalyst in a reaction zone maintained at FCC reaction conditions, which catalyst comprises about 2000 wt. ppm accumulated metal, from about 10 to about 50 wt percent molecular sieve, from about 5 to 25 wt percent of a monohydrate alumina having an average pore diameter greater than 90 angstroms, from about 3 to about 15 wt percent bastnaesite, from about 10 to 25 wt percent of a siliceous binder and from about 20 to about 60 wt percent of an inert refractory inorganic oxide material, with the catalyst having a surface area of 25-60 m2/g and the overall catalyst having a surface area between 150 and 350 m2/g.

It is contemplated that the three major components of the catalyst composition of the present invention, those being the molecular sieve, the large pore matrix component, and the rare earth component, may be prepared either by mixing them together with one or more other matrix components prior to introducing them into an FCC catalyst, or alternatively, these components may be prepared by mixing each one separately with one or more other matrix components, or alternatively they may be prepared by mixing any combination of any two of these components.

One embodiment of the invention may be characterized as a method of manufacturing an FCC catalyst which comprises (a) forming an admixture which comprises: (i) from about 10-40 wt. % zeolite; (ii) about 5 to about 15 wt. percent of a boehmite alumina having an average pore diameter of about 90 to 200 angstroms; (iii) about 3 to 15 weight percent bastnaesite; (iv) about 10 to 25 weight percent of a binder; and (v) about 20-about 60 wt. percent of an inert refractory oxide; and, (b) forming catalystsized particles containing said admixture, by spray drying. FCC catalyst is normally a fine powder having particle diameters of 20-150 microns and an average diameter of 60-80 microns. The catalyst particles of the subject invention are uniform in composition and are essentially not separable into fractions of differing composition or characteristics as by elutriation. They could, however, be used with additives of different composition.

It is further contemplated that the nonexchangeable rare earth component of the present invention may be comprised of bastnaesite alone, any other rare earth containing component which will not exchange with molecular sieve cations, or any combination of bastnaesite with any such other rare earth containing component. Specific examples include rare earth carbonates, fluorocarbonates, oxyfluorides and phosphates containing lanthanum and/or cerium. The previously mentioned rare earth ores may be used. These materials will normally contain a mixture of rare earths including praseodymium, neodymium and samarium.

It is also contemplated that other large pore matrix components in addition to large pore alumina can also be effectively utilized to form a catalyst which will exhibit the improved characteristics of the FCC catalysts exemplified in the present invention.

While the benefits of the present invention have only been exemplified utilizing an LZ-210 type molecular sieve as one of the basic components of the catalyst it is contemplated that any other sieve derived from Na-Y may be used to equal advantage. Such sieves include without limitation rare earth hydrogen Y, calcined rare earth Y, LZ-210 molecular sieves and other dealuminated or ultrastable molecular sieves including those described in U.S. Pat. Nos. 4,401,556 (columns 6-81) and 4,869,803 which are incorporated herein by reference for their teaching as to the preparation of dealuminated Y zeolites. Beta zeolite can also be employed in the subject catalyst as a portion or all of the molecular sieve component. Some ZSM or MFI type zeolite can also be present in the catalyst.

While the benefits of the present invention have only been exemplified in catalysts utilizing bastnaesite up to 15 wt %, it is contemplated that higher levels of bastnaesite may be employed under specific conditions to equal or greater advantage, and catalyst compositions including such higher levels of bastnaesite or appropriate rare earth compounds are considered to be within the scope of the present invention.

While the invention has been described with respect to various specific examples and embodiments, it is to be understood that the invention is not limited thereto and that it may be variously practiced within the scope of the following claims:

What is claimed:

1. A fluidized catalytic cracking process which comprises contacting a feedstream containing nickel and/or vanadium with a catalyst in a reaction zone maintained at FCC reaction conditions, which catalyst comprises over about 1000 ppm accumulated metal, from about 10 to about 50 wt percent molecular sieve, from about 5 to 20 wt percent of a monohydrate alumina having an average pore diameter greater than 90 angstroms, and from about 3 to about 15 wt percent bastnaesite.

2. The invention of claim 1 wherein the matrix of the catalyst has a surface area of about 25 to 60 m$^2$/g and the surface area of the overall catalyst is over 150 m$^2$/g.

3. A fluidized catalytic cracking process which comprises contacting a feedstream containing at least 1 wt ppm nickel and vanadium with a catalyst in a reaction zone maintained at FCC reaction conditions, which catalyst comprises from about 10 to about 50 wt percent molecular sieve, from about 5 to 20 wt percent of a monohydrate alumina having an average pore diameter greater than 90 angstroms, from about 3 to about 15 wt percent bastnaesite and from about 10 to 25 wt percent of a binder.

4. The process of claim 2 wherein the molecular sieve component is selected from the group consisting of dealuminated Y zeolite, rare earth containing zeolite Y, zeolite beta, and LZ-210 molecular sieves.

5. A fluidized catalytic cracking process which comprises contacting a feedstream containing at least 1 wt ppm nickel and vanadium with a catalyst in a reaction zone maintained at FCC reaction conditions, which catalyst comprises about 2000 wt. ppm accumulated metal, from about 10 to about 50 wt percent molecular sieve, from about 5 to 20 wt percent of a monohydrate alumina having an average pore diameter greater than 90 angstroms, from about 3 to about 15 wt percent bastnaesite, from about 10 to 25 wt percent of a siliceous binder and from about 20 to about 60 wt percent of an inert refractory inorganic oxide material, with the catalyst matrix having a surface area of 25-60 m$^2$/g and the overall catalyst having a surface area between 150 and 350 m$^2$/g.

6. The process of claim 5 wherein the alumina is a boehmite alumina.

7. The process of claim 6 wherein the inert refractory oxide is a clay.

8. The process of claim 6 wherein the molecular sieve component is selected from the group consisting of dealuminated Y zeolites, rare earth containing zeolite Y, zeolite beta, LZ-210 molecular sieves and ZSM molecular sieves.

* * * * *